United States Patent [19]

Aoyama et al.

[11] Patent Number: 4,869,647
[45] Date of Patent: Sep. 26, 1989

[54] CIRCULAR ELECTROMAGNETIC FLOW COUPLER

[75] Inventors: Goro Aoyama; Ryuhei Kawabe, both of Hitachi; Takashi Ikeda, Katsuta; Tadashi Goto, Hitachi, all of Japan

[73] Assignee: Hitachi, Ltd., Tokyo, Japan

[21] Appl. No.: 230,055

[22] Filed: Aug. 9, 1988

[30] Foreign Application Priority Data

Aug. 12, 1987 [JP] Japan ................. 62-199790

[51] Int. Cl.⁴ .......................................... H02K 44/00
[52] U.S. Cl. .......................................... 415/50; 310/11
[58] Field of Search ............................ 417/50; 310/11

[56] References Cited

U.S. PATENT DOCUMENTS 4,469,471 9/1984 Keeton et al. .................. 417/50
4,688,996 8/1987 Alexion et al. .................. 417/50

OTHER PUBLICATIONS

Panholzer, R., "Electromagnetic Pumps", article in Electrical Engineering, Feb. 1963, pp. 128-135.
McNab, I. R. and Alexion, C. C., authors of "High-Efficiency DC Electromagnetic Pumps and Flow Couplers for LMFBRs", Jan. 1981, for Electric Power Research Institute.

Primary Examiner—Carlton R. Croyle
Assistant Examiner—D. Scheuermann
Attorney, Agent, or Firm—Antonelli, Terry & Wands

[57] ABSTRACT

A circular electromagnetic flow coupler comprises a circular flow path, conductive partition walls which divide the circular flow path into generator side flow paths and pump side flow paths in the circumferential direction thereof, insulators for insulating the inside and outside of the flow paths, and magnetic poles for generating a magnetic field in the radial direction of the circular flow path. The insulators are provided with openings so that they are not damaged when pressure is exerted thereto.

19 Claims, 11 Drawing Sheets

CIRCULAR ELECTROMAGNETIC FLOW COUPLER

BACKGROUND OF THE INVENTION

The present invention relates to an electromagnetic flow coupler which serves to drive liquid and more particularly to an arrangement of an insulator which is suitable to enhance the efficiency of an electromagnetic flow coupler.

Figure 2:
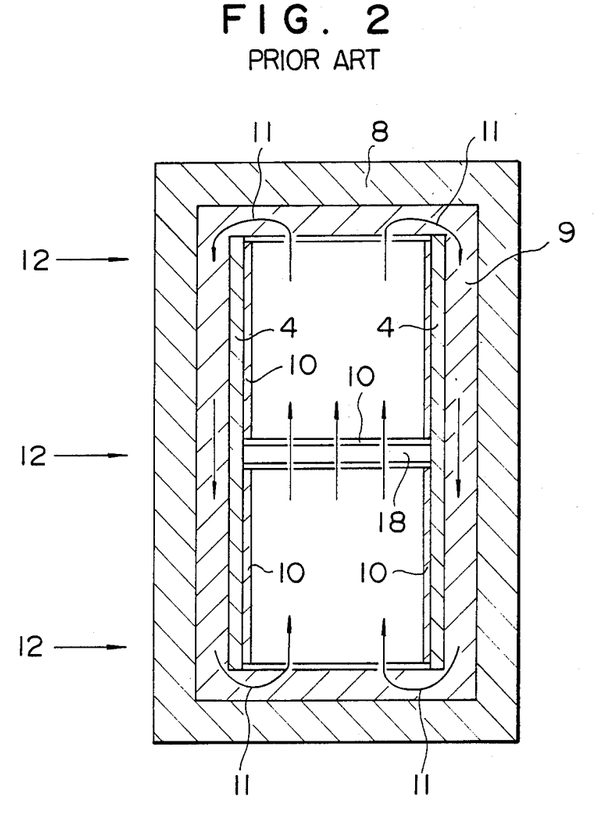
FIG. 2 is a sectional view of the conventional electromagnetic flow coupler.
Figure 3:
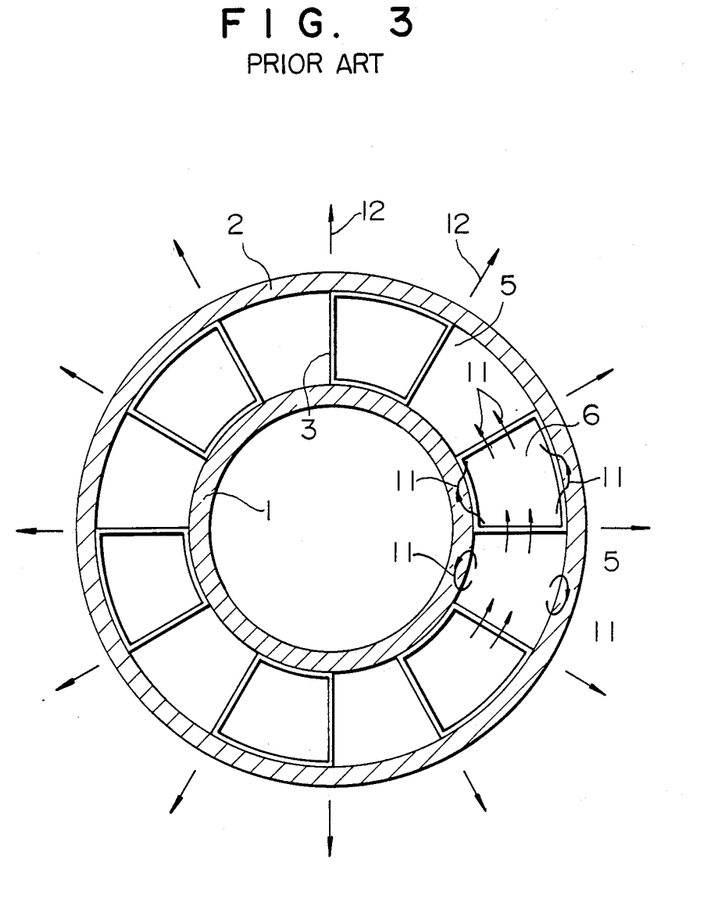
FIG. 3 is a sectional view of the conventional circular electromagnetic flow coupler.

The previously known electromagnetic flow coupler is a square flow path type electromagnetic flow coupler as disclosed in Japanese patent unexamined publication JP-A-59-10163. This square flow path type electromagnetic flow coupler prevents current from leaking into the side wall 9 of the flow path by arranging an insulating material 4 on the side wall as shown in FIG. 2. However, since the current which contributes to drive the fluid must flow through a conductive duct 9 as indicated by arrows 11 in FIG. 2, Joule loss (heat) will be disadvantageously produced. To eliminate the Joule loss in the duct, a circular flow path type electromagnetic flow coupler (hereinafter referred to as a circular electromagnetic flow coupler) as shown in FIG. 3 has been proposed. This circular electromagnetic flow coupler permits current to flow in a loop manner in the circumferential direction in the fluid so that the side of the flow path is not insulated. However, actually, due to the difference in electrical conductivity between fluid, e.g. liquid metal sodium and the side wall of an inner tube 1 or outer tube 2, as indicated by arrows 11 in FIG. 3, a part of the current generated in the generator side flow path 5 leaks to the side wall 1 or 2 on the generator side and a part of the current in the pump side flow path 6 also leaks to the side walls on the pump side. Since the current leaks to the side wall in this way, the current produced in the fluid on the generator side is not smoothly propagated to the fluid on the pump side. Thus, force for driving the fluid on the pump side becomes small. Accordingly, the efficiency of the above circular electromagnetic flow coupler will be deteriorated.

In short, the above prior art circular electromagnetic flow coupler provides the following problem to be solved. Since the side wall is not insulated, current leaks to the side wall. Thus, this circular electromagnetic flow coupler can not attain its object, i.e. to eliminate the Joule loss in the side wall. This reduces the current which is to contribute to drive the pump side current, thereby attenuating the efficiency of the circular electromagnetic flow coupler. Further, even if the flow path side is coated with an insulator to prevent the current from leaking to the side wall, a high pressure is exerted to the insulator due to the difference in thermal expansion coefficient between the tube material or the used fluid, e.g. sodium and the insulator, so that the insulator may be damaged or destroyed.

SUMMARY OF THE INVENTION

An object of the present invention is to provide a circular electromagnetic flow coupler which can soundly maintain an insulator arranged on the side of a flow path to prevent current from leaking into the side walls of tubes.

The above object can be attained by providing the insulators with openings.

The operation of the circular electromagnetic flow coupler according to the present invention will be explained. An insulator is disposed between the outer peripheral wall of each conductive flow path tube and the outer tube and fixed to the outer peripheral wall of the conductive flow path tube. When the ambient temperature is increased, the tube material and the fluid sodium are expanded, but the insulator material is not so expanded. Thus, a gap if formed between the insulator and the outer tube. The circular electromagnetic flow coupler is constructed so that the pressure in the flow path exerted to the insulator is supported by the outer tube. In this case, if the insulator is not made in the form of a cylinder provided with openings, the insulator serves as a pressure boundary for the fluid, i.e. liquid metal sodium since the gap has been formed between the insulator and outer tube. Thus, a high pressure is exerted to the insulator, and hence the insulator may be damaged or destroyed. However, if the insulator is provided with openings, the liquid metal sodium flows through the openings of the insulator into the gap formed between the insulator and the outer tube so that a high pressure will not be exerted to the insulator.

Figure 4A:
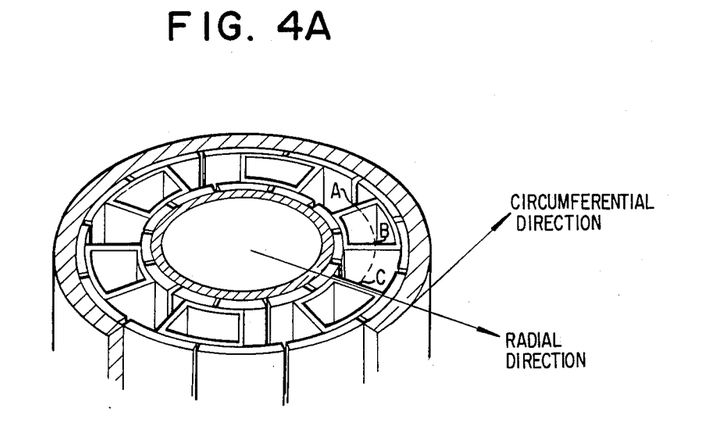
FIG. 4A is a view for explaining the radial direction and the peripheral direction in FIG. 1.
Figure 4B:
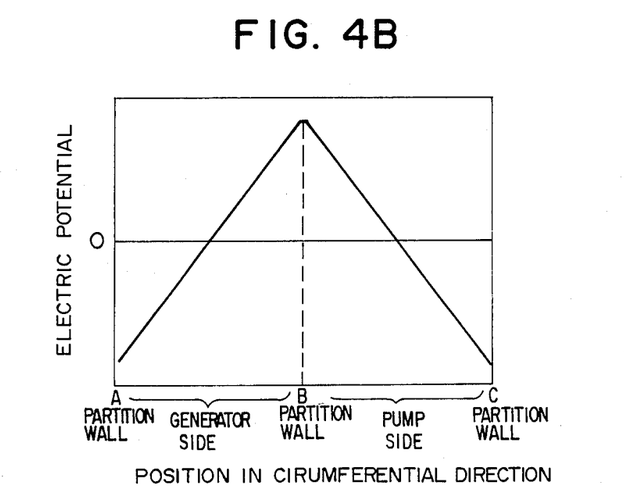
FIG. 4B is a graph showing the distribution in the electric potential in the peripheral direction in FIG. 4A.

In this case, some cautions are required in providing openings to the insulators. FIG. 4B shows the distribution of the electric potential in the circumferential direction along a circular line passing A, B and C in FIG. 4A which are equally spaced in the radial direction from the center axis of the circular electromagnetic flow coupler. In order that the electric potential returns to an original value in one round in the peripheral direction, equal electric potential points must exist on the sides of the generator and of the pump. If the sizes of the generator side flow path and the pump side flow path are equal to each other in the circumferential direction, respectively, the electric potential distribution for a set of the generator side flow path and the pump side flow path is as shown in FIG. 4B. As seen from the figure, the electric potential is increased from one side to the opposite side on the generator side flow path and reaches a maximum value at a partition wall of the opposite side. The electric potential is then reduced from the side of that partition wall to the opposite side on the pump side flow path and reaches a minimum value at another partition wall of the opposite side. This minimum value on the pump side flow path is equal to a minimum value on the generator side flow path. If it is assumed that an opening is provided in the insulator at the position of zero electric potential in FIG. 4B, the corresponding position exist on both generator and pump sides. Therefore, even if the fluid is in contact with the side wall at the opening positions, the electric potential on the side wall is kept zero in the entire circumferential direction and thus the current does not leak into the side wall. Accordingly, it is most desirable to provide openings at such points.

The above and other objects and features will become more apparent from the following description taken in conjunction with the accompanying drawings.

DESCRIPTION OF THE PREFERRED EMBODIMENTS

Figure 1:
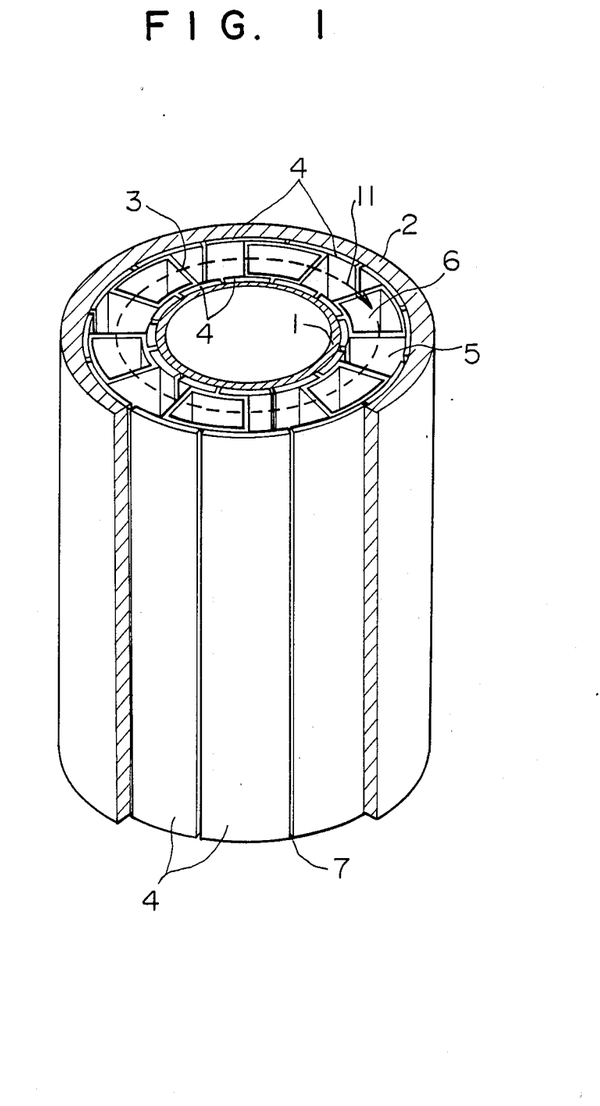
FIG. 1 is a perspective view, partly in section, of an electromagnetic flow coupler according to a first embodiment of the present invention.

A first embodiment of the present invention will be explained with reference to FIGS. 1 and 5. As shown in FIG. 1, a circular space formed between coaxial cylindrical inner and outer tubes 1 and 2 is partitioned into generator side flow paths 5 and pump side flow paths 6 alternately disposed and made by conductive flow path tubes 3. Each of insulators 4 is arranged on the outer side of the inner tube 1 and the inner side of the outer tube 2. The insulators 4 are fixed to the conductive flow tubes 3. As shown in detail in FIG. 5, the insulators 4 are not in contact with the inner tube 1 and the outer tube 2, providing minute gaps 13 between the insulators 4 and the inner and outer tubes 1 and 2. Each of the gaps 13 is required to have a distance enough to absorb difference in thermal expansion coefficients of the inner tube 1, the outer tube 2, the conductive flow path tubes 3 and the insulators 4. The insulator 4 is cut to provide an opening or slit 7 at the center position in the circumferential direction of both generator side flow path 5 and pump side flow path 6. As well known in the art, in the circular electromagnetic flow coupler, an electric current flows to circulate across the flow paths in a direction shown by an arrow 11 in FIG. 1. Further, the outer tube 2 is insulated from the earth potential. If the size of the flow path in the circumferential direction in the circular electromagnetic flow coupler is equal, the electric potential at the center position of the flow path is zero, when the electrical current flows across the flow paths as mentioned above. Since the electric potential at the center position of the flow path is zero in the entire axial length of the inner and outer tubes 1 and 2 the current does not leak into the side walls of the inner and outer tubes even if the insulators 4 are cut in the circumferential to provide slits 7 extended in the axial direction.

A second embodiment of the present invention will be explained with reference to FIG. 6. This embodiment is different from the embodiment of FIGS. 1 and 5 in that the number of openings 7 is smaller than that in the latter. Namely, in this embodiment, the openings 7 of the insulators 4 are provided at the center positions of only the generator side flow paths 5. Although not shown, these openings 7 may be provided in like manner only for the pump side flow paths 5. The number of openings 7 may be further reduced if the insulators 4 can endure the applied pressure.

Figure 5:
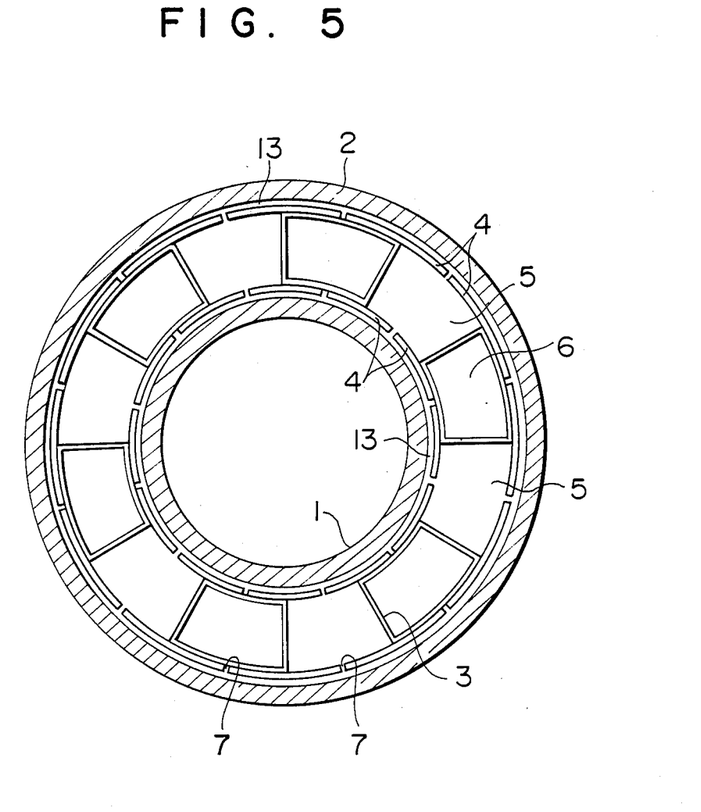
FIG. 5 is a sectional view of an electromagnetic flow coupler according to the first embodiment of the present invention.
Figure 6:
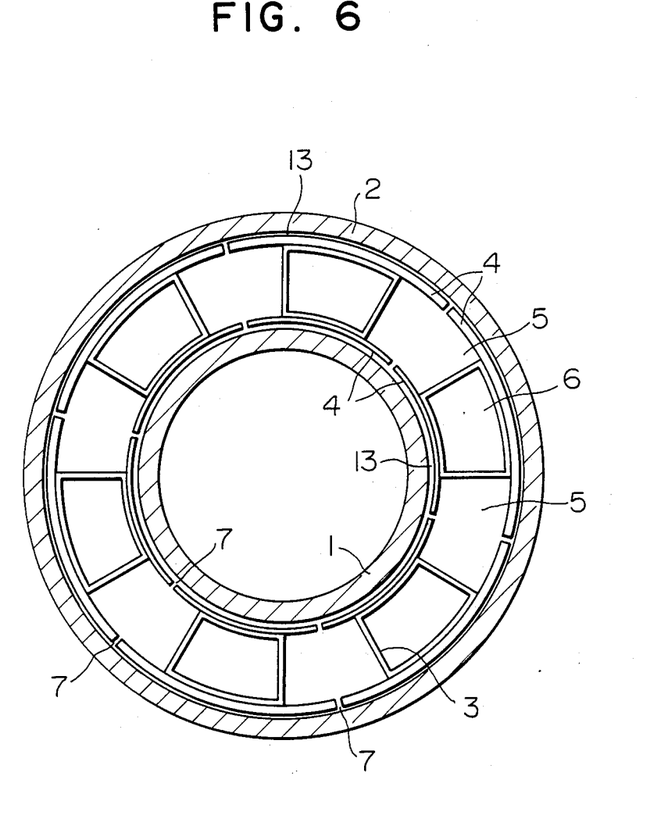
FIG. 6 is a sectional view of an electromagnetic flow coupler according to a second embodiment of the present invention.
Figure 7:
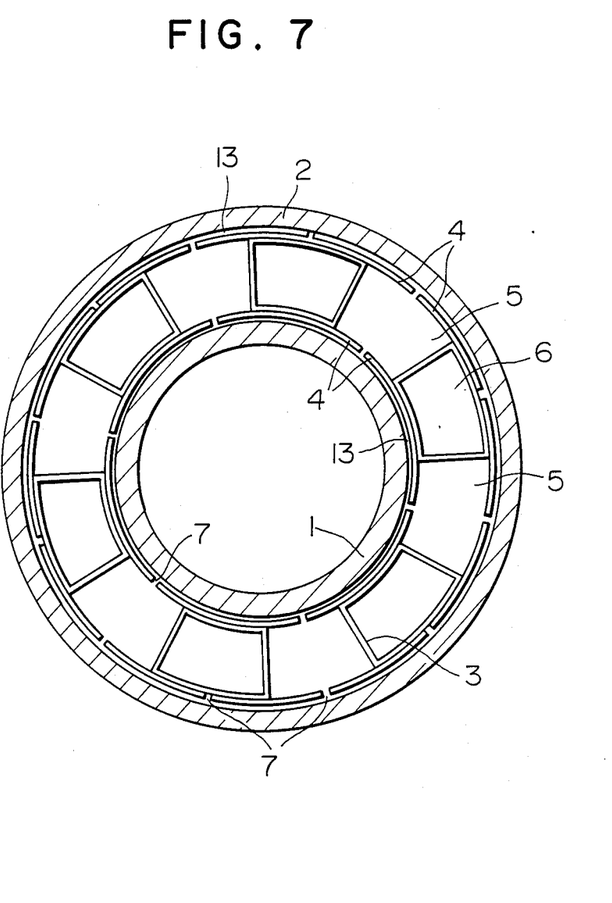
FIG. 7 is a sectional view of an electromagnetic flow coupler according to a third embodiment of the present invention.

A third embodiment of the present invention as shown in FIG. 7 is different from the first embodiment of FIGS. 1 and 5 in that the number of the openings is different on the inside of and the outside of the flow paths. Namely, in this embodiment, on the inside, the insulator 4 is cut at the center positions of only the generator side flow paths 6, whereas on the outside the insulator 4 is cut at the center positions of both the generator side flow path 6 and the pump side flow paths 5.

Figure 8:
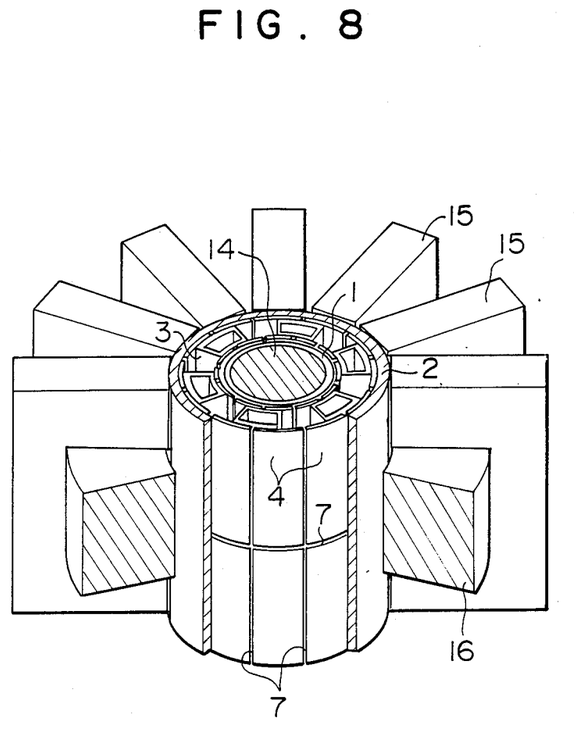
FIG. 8 is a perspective view, partly in section, of an electromagnetic flow coupler according to a fourth embodiment of the present invention.

A fourth embodiment of the present invention will be explained with reference to FIG. 8. The insulators 4 are cut in the circumferential direction in the same manner as in the first embodiment of FIGS. 1 and 5. In this embodiment, in order to provide a magnetic field in the radial direction of the flow coupler, an inner iron core 14 is arranged inside the coaxial cylindrical inner tube 1 and comb-shape outer iron cores 15 called stators are arranged outside the coaxial cylindrical tube 2. Also, an exciting coil 16 is coaxially wound on the exterior side of the outer tube 2.

Figure 9:
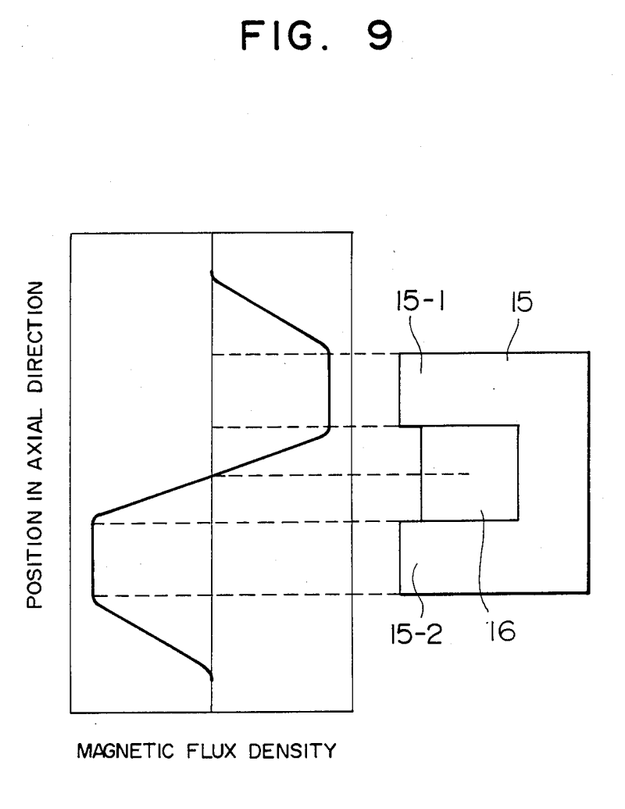
FIG. 9 is a graph showing the magnetic flux density in a circular electromagnetic flow coupler.

The distribution of the magnetic flux density in a plane containing the center axis of the coupler produced by the exciting coil 16 is shown in FIG. 9. As shown in FIG. 9, the magnetic flux is zero at the center position between two poles 15-1 and 15-2 of any magnetic pole 15 where the exciting coil 16 is located. Therefore, while the operating fluid, sodium is moving in the generator side flow paths 5, an electromotive force is not produced since the product of the fluid velocity and the magnetic flux density is zero. Thus, the electric potential at the center position of the exciting coil 16 is also zero. This fact is used in this embodiment to shorten the length of the insulator 4 in the axial direction. More specifically, the insulator 4 is cut to provide openings 7 not only in the peripheral direction but also at the center position of the exciting coil 16. In this case, the current does not leak to the side walls when the fluid in the flow paths is contact with the side walls since the electric potential in the flow path is zero.

Figure 10:
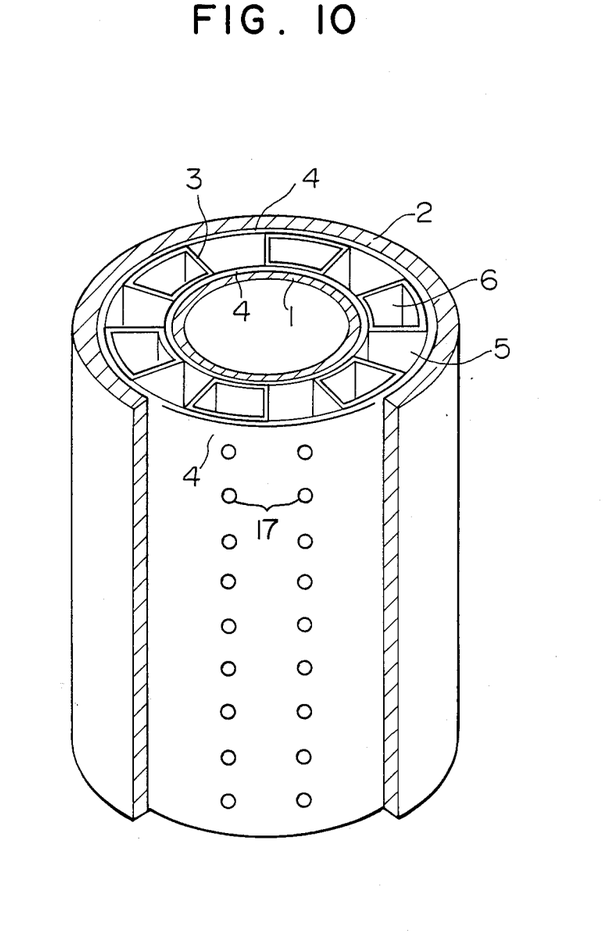
FIG. 10 is a perspective view, partly in section, of an electromagnetic flow coupler according to a fifth embodiment of the present invention.

A fifth embodiment of the present invention will be explained with reference to FIG. 10. Pores 17 are made in the insulators 4 at the positions in the same circumferential direction as in the first embodiment of FIGS. 1 and 5, and also pores 17 are made at suitable intervals in the axial direction. Since the pressure of the liquid metal sodium is exerted to the outer tube 2 through the openings 17, the insulators 4 will not be damaged or destroyed.

Figure 11:
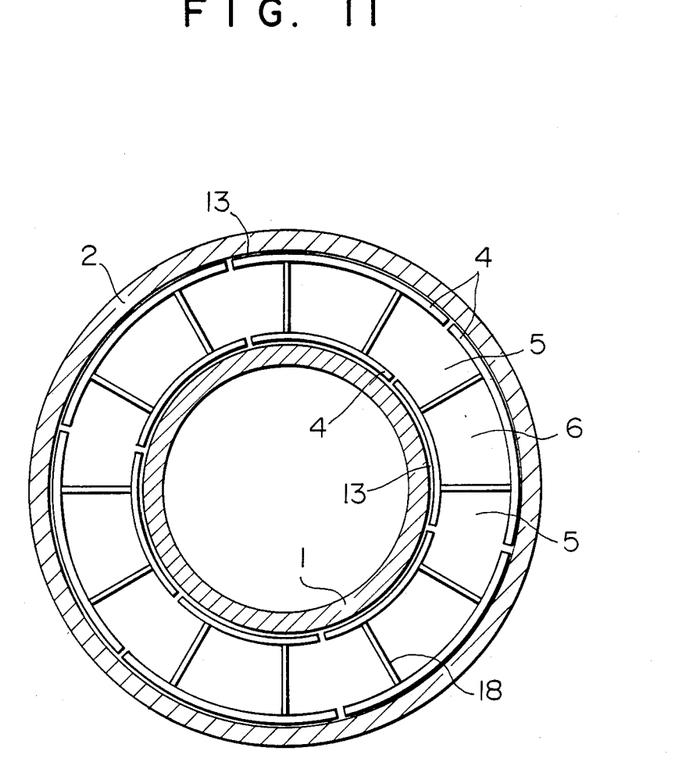
FIG. 11 is a sectional view of an electromagnetic flow coupler.

A sixth embodiment of the present invention will be explained with reference to FIGS. 11 and 5. If, as shown in FIG. 5, the conductive flow path tubes 3 are used to divide the circular space formed between the inner tube 1 and the outer tube 2 into the generator side flow paths 5 and the pump side flow paths 6, a small amount of current flows into the sides of the conductive flow path tubes 3 which are in parallel to the inner and outer tubes 1 and 2. This means that excess current flows which does not contribute to drive the fluid in the pump side flow paths. In order to remove this excess current, conductive partition walls 18 are used to form the generator side flow paths 5 and the pump side flow paths 6. As shown in FIG. 11, each of the partition walls 11 is directly bonded, at its both ends, to the insulators 4. However, if the insulators 4 are cut at the center positions in the circumferential direction of both the generator side flow paths 5 and the pump side flow paths 6, as in the embodiment of FIG. 5, the fluids in both the flow paths will be mixed. Therefore, the insulators 4 are required to be cut for only either the generator side flow paths 5 or the pump side flow paths 6. The insulators 4 may be cut at different positions on the inside and outside of the flow paths in the radial direction. More specifically, the insulator 4 may be cut for the generator side flow path 5 on the inside thereof in the radial direction whereas it may be cut for the pump side flow paths 6 on the outside thereof in the radial direction, and vice versa.

In the embodiments of the present invention mentioned above, when the insulator 4 has not been supported by the outer tube 2 because of the gap formed therebetween (which is formed when the diameter of the outer tube is increased due to its thermal expansion), the liquid metal sodium flows into the gap through the openings provided in the insulator. Thus, the insulator does not serve as a pressure boundary for the liquid metal sodium. Accordingly, a high pressure is not exerted to the insulator so that there is no fear for the insulator being damaged or destroyed. Further, by arranging the openings provided in the insulators at the positions where electric potentials are obtained for both the generator side flow paths and the pump side flow paths of the electromagnetic flow coupler, the leak of current into the side walls, which is a cause of deteriorating the efficiency of the electromagnetic flow coupler, can be prevented.

In accordance with the present invention, by cutting the insulators into plural pieces, the pressure exerted to each pieces can be relaxed so that the insulators can be soundly maintained. Thus, the insulators can be adopted to enhance the efficiency of a circular electromagnetic flow coupler.

We claim:

1. A circular electromagnetic flow coupler comprising at least two flow paths through which fluid material flows, magnetic field means for applying magnetic fields to the fluid material flowing through said flow paths, and insulator means provided adjacent to at least a part of inner sides of walls of said flow paths, said insulator means being provided with openings to divide said insulator means into a plurality of insulator elements at those portions where the potential of the fluid material flowing through said flow paths is substantially zero, when an electric current flows across said flow paths.

2. A circular electromagnetic flow coupler comprising at least two flow paths through which fluid material flows, magnetic field means for applying magnetic fields to the fluid material flowing through said flow paths, and insulator means provided adjacent to at least a part of inner sides of walls of said flow paths, said insulator means being provided with openings to divide said insulator means into a plurality of insulator elements at those portions which are corresponding to center lines of the flow paths in a direction perpendicular to the direction of the magnetic fields applied to the fluid material flowing therethrough.

3. A circular electromagnetic flow coupler comprising at least two flow paths through which fluid material flows, magnetic field means for applying magnetic fields to the fluid material flowing through said flow paths, and insulator means provided adjacent to at least a part of inner sides of walls of said flow paths, said insulator means being provided with openings to divide said insulator means into a plurality of insulator elements and wherein said flow paths are formed by dividing an annular space provided between two concentric cylindrical tubes into at least two parts constituting said flow paths, respectively.

4. A circular electromagnetic flow coupler comprising at least two flow paths through which fluid material flows, magnetic field means for applying magnetic fields to the fluid material flowing through said flow paths, and insulator means provided adjacent to at least a part of inner sides of walls of said flow paths, said insulator means being provided with openings to divide said insulator means into a plurality of insulator elements at portions selected such that the potential difference between inner and outer sides of said insulator means is substantially zero at said portions and the outer side of said insulator means is insulated from an earth potential.

5. A circular electromagnetic flow coupler comprising at least two flow paths through which fluid material flows, magnetic field means for applying magnetic fields to the fluid material flowing through said flow paths, and insulator means provided adjacent to at least a part of inner sides of walls of said flow paths, said insulator means being provided with openings to divide said insulator means into a plurality of insulator elements by slits.

6. A circular electromagnetic flow coupler comprising:
a circular flow path;
conductive partition walls for dividing the circular flow path into generator side flow paths and pump side flow paths in the circumferential direction thereof;
insulators for insulating the inside and outside of the flow paths, respectively, said insulators each having openings arranged for both or either one of the generator side flow paths and the pump side flow paths so that the electric potentials at the openings are substantially equal to each other; and
magnetic poles for generating a magnetic field in the radial direction of said circular flow path.

7. A circular electromagnetic flow coupler comprising:
a circular flow path;
conductive partition walls for dividing the circular flow path into generator side flow paths and pump side flow paths in the circumferential direction thereof;
insulators for insulating the inside and outside of the flow paths, respectively, said insulators each having openings arranged at the positions where the electric potentials of fluid in the flow paths corresponding to the openings are substantially zero; and
magnetic poles for generating a magnetic field in the radial direction of said circular flow path.

8. A circular electromagnetic flow coupler comprising at least two flow paths through which conductive fluid material flows, magnetic field means for applying magnetic fields to said fluid material flowing through said flow paths and insulator means provided adjacent to at least a part of at least on one of inner and outer side walls of said flow paths, said insulator means being divided along at least one line extending parallel to an axial direction in which said fluid material flows through said flow paths.

9. A circular electromagnetic flow coupler according to claim 8, wherein said line along which said insulator means is divided is corresponding to an equipotential line where equal potentials are introduced when an electric current flows across said flow paths.

10. A circular electromagnetic flow coupler according to claim 8, wherein said line along which said insulator means is divided is corresponding to a zero potential line where a substantially zero potential is introduced when an electric current flows across said flow paths.

11. A circular electromagnetic flow coupler according to claim 8, wherein said insulator means is divided along a plurality of lines parallel to said axial direction.

12. A circular electromagnetic flow coupler according to claim 11, wherein each of said plurality of lines is corresponding to an equipotential line where substantially equal potentials are introduced when an electric current flows across said flow paths.

13. A circular electromagnetic flow coupler according to claim 11, wherein said plurality of lines are corresponding to those lines where substantially equal potentials are introduced when an electric current flows across said flow paths.

14. A circular electromagnetic flow coupler according to claim 11, wherein said plurality of lines are corresponding to those lines where substantially zero potential is introduced when an electric current flows across said flow paths.

15. A circular electromagnetic flow coupler according to claim 14, wherein said insulator means is further divided along at least one line extending circumferentially of said circular electromagnetic flow coupler and corresponding to a zero potential line where a substantially zero potential is introduced when an electric current flows across said flow paths.

16. A circular electromagnetic flow coupler comprising at least two flow paths through which conductive fluid material flows, magnetic field means for applying magnetic fields to said fluid material flowing through said flow paths and insulator means provided adjacent to at least a part of at least one of inner and outer side walls of said flow paths, said insulator means being provided with at least a series of openings formed along a line parallel to an axial direction in which said fluid material flows through said flow paths so that said fluid material is allowed to flow through said openings.

17. A circular electromagnetic flow coupler according to claim 16, wherein said line along which said openings are formed is corresponding to an equipotential line where substantially equal potentials are introduced when an electric current flows across said flow paths.

18. A circular electromagnetic flow coupler according to claim 16, wherein said line along which said openings are formed is corresponding to a zero potential line where a substantially zero potential is introduced when an electric current flows across said flow paths.

19. A circular electromagnetic flow coupler comprising a plurality of flow paths through which conductive fluid material flows, magnetic field means for applying magnetic fields to said fluid material flowing through said flow paths and insulator means including inner and outer insulator members provided adjacent to inner and outer side walls of said flow paths, respectively, each of said inner and outer insulator members being divided along at least one line extending parallel to an axial direction in which said fluid material flows through said flow paths and corresponding to a zero potential line where a substantially zero potential is introduced when an electric current flows across said flow paths.

* * * * *